US010464480B2

United States Patent
Yamada et al.

(10) Patent No.: US 10,464,480 B2
(45) Date of Patent: Nov. 5, 2019

(54) VEHICULAR DISPLAY DEVICE

(71) Applicant: TOYOTA JIDOSHA KABUSHIKI KAISHA, Toyota-shi, Aichi-ken (JP)

(72) Inventors: Yoshinori Yamada, Nagakute (JP); Yasutomo Kato, Okazaki (JP); Satoshi Yamamichi, Nagoya (JP); Masaki Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/131,609

(22) Filed: Sep. 14, 2018

(65) Prior Publication Data

US 2019/0111843 A1 Apr. 18, 2019

(30) Foreign Application Priority Data

Oct. 12, 2017 (JP) .................. 2017-198334

(51) Int. Cl.
| | | |
|---|---|---|
| *B60Q 9/00* | (2006.01) | |
| *B60K 37/00* | (2006.01) | |
| *B62D 15/02* | (2006.01) | |
| *B62D 1/06* | (2006.01) | |

(52) U.S. Cl.
CPC ............. *B60Q 9/008* (2013.01); *B60K 37/00* (2013.01); *B62D 15/029* (2013.01); *B62D 1/06* (2013.01)

(58) Field of Classification Search
CPC ........ B60Q 9/008; B62D 1/06; B62D 15/029; B60K 37/00
USPC ....................................................... 340/435
See application file for complete search history.

(56) References Cited

U.S. PATENT DOCUMENTS

| | | | | |
|---|---|---|---|---|
| 6,739,620 | B2* | 5/2004 | Derrick | B60Q 1/1484 |
| | | | | 280/731 |
| 7,126,583 | B1* | 10/2006 | Breed | B60K 35/00 |
| | | | | 345/158 |
| 8,886,396 | B2* | 11/2014 | Kobayashi | B60K 37/02 |
| | | | | 340/438 |
| 9,056,676 | B1* | 6/2015 | Wang | B64F 1/00 |
| 9,159,221 | B1* | 10/2015 | Stantchev | G08C 17/02 |
| 10,222,613 | B2* | 3/2019 | Kawamoto | B60K 35/00 |
| 2008/0023253 | A1* | 1/2008 | Prost-Fin | B60K 35/00 |
| | | | | 180/400 |

(Continued)

FOREIGN PATENT DOCUMENTS

JP 2016-045705 A 4/2016

*Primary Examiner* — Hirdepal Singh
(74) *Attorney, Agent, or Firm* — Oliff PLC

(57) ABSTRACT

A vehicular display device includes a surrounding information obtaining unit configured to obtain surrounding information indicating a surrounding situation of a host vehicle, and a display ECU configured to inform a driver of the presence of a warning object that needs to be recognized by the driver through displaying of an in-vehicle display unit when the warning object is detected based on the surrounding information. The in-vehicle display unit has a display screen in a region surrounded by a grip of a steering wheel in a planar positional relationship when the driver views the steering wheel. The display ECU is configured to display a host vehicle mark in a central position of the steering wheel in a right-left width direction and display a warning object mark indicating the warning object in a position corresponding to a direction of the warning object relative to the host vehicle on the display screen.

3 Claims, 6 Drawing Sheets

(56) References Cited

U.S. PATENT DOCUMENTS

| | | | |
|---|---|---|---|
| 2008/0061954 A1* | 3/2008 | Kulas | B60K 35/00 |
| | | | 340/438 |
| 2008/0211651 A1* | 9/2008 | Beutnagel-Buchner | |
| | | | B62D 1/046 |
| | | | 340/459 |
| 2013/0063336 A1* | 3/2013 | Sugimoto | B60K 35/00 |
| | | | 345/156 |
| 2013/0239732 A1* | 9/2013 | Gordh | B60K 37/06 |
| | | | 74/484 R |
| 2015/0321606 A1* | 11/2015 | Vartanian | G02B 27/0101 |
| | | | 348/148 |
| 2016/0052394 A1 | 2/2016 | Yamada | |
| 2017/0048080 A1* | 2/2017 | Grimm | H04L 12/40032 |
| 2017/0291493 A1* | 10/2017 | Bostick | B60K 35/00 |
| 2018/0143754 A1* | 5/2018 | Niazi | G06F 3/0488 |

\* cited by examiner

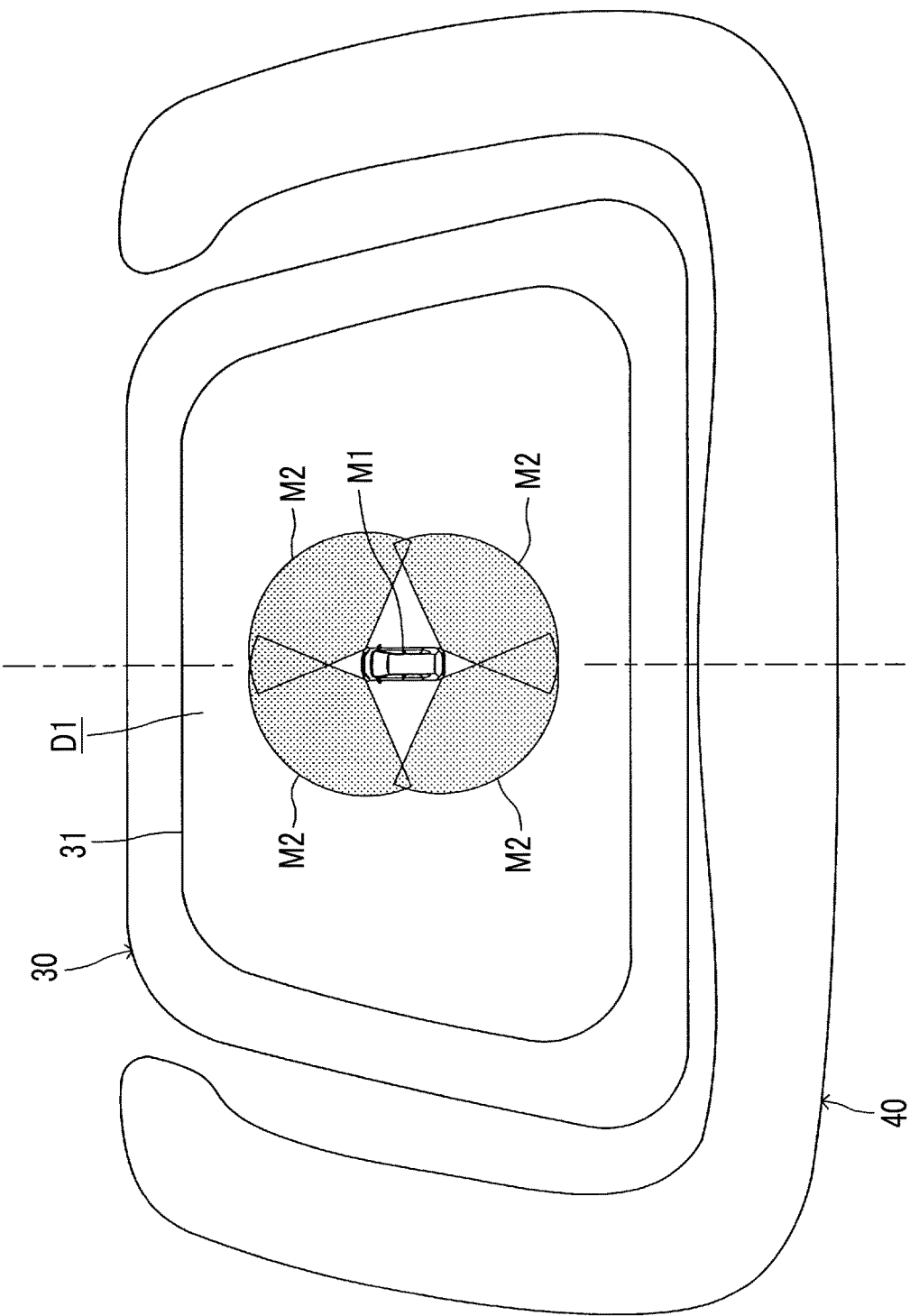

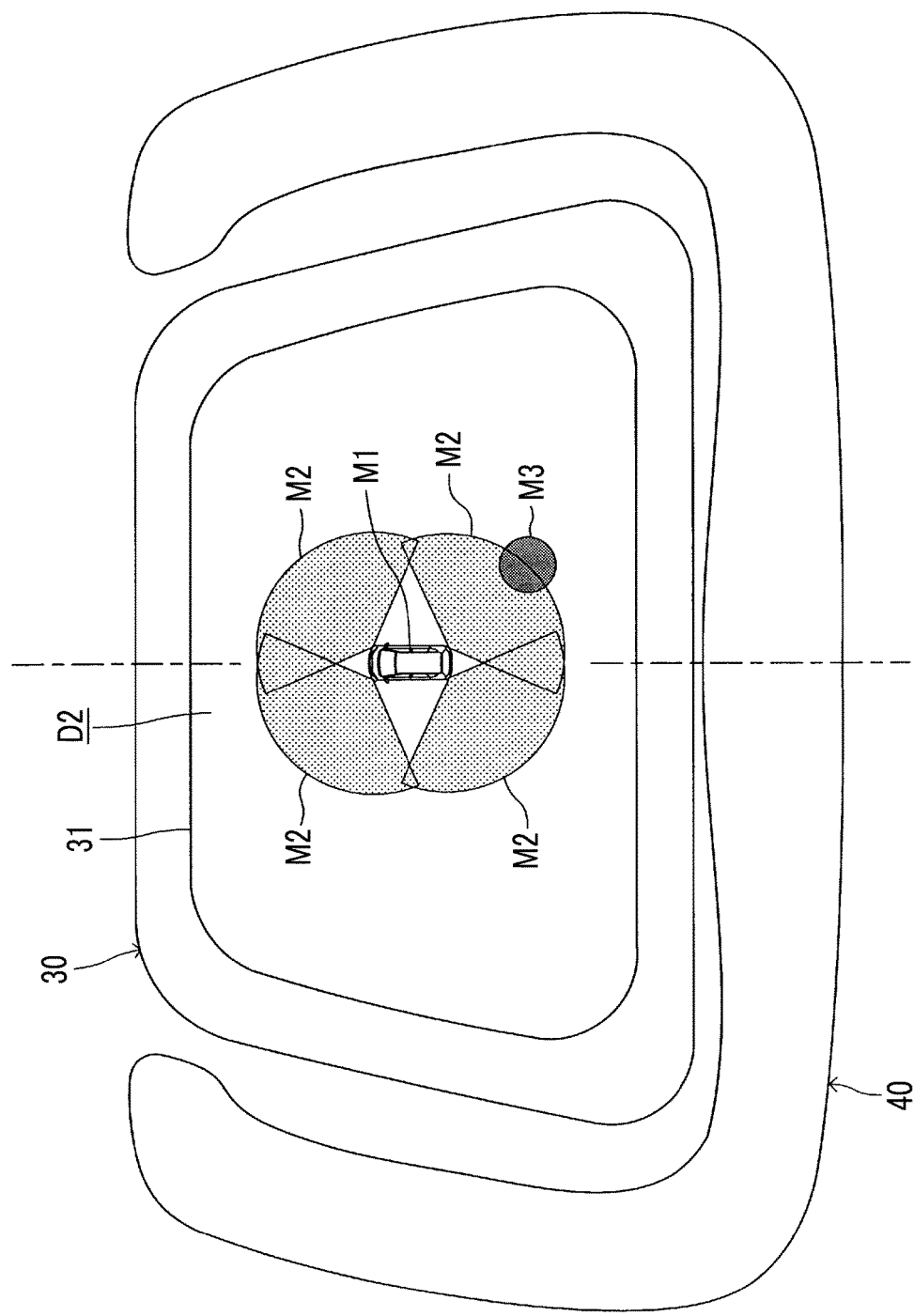

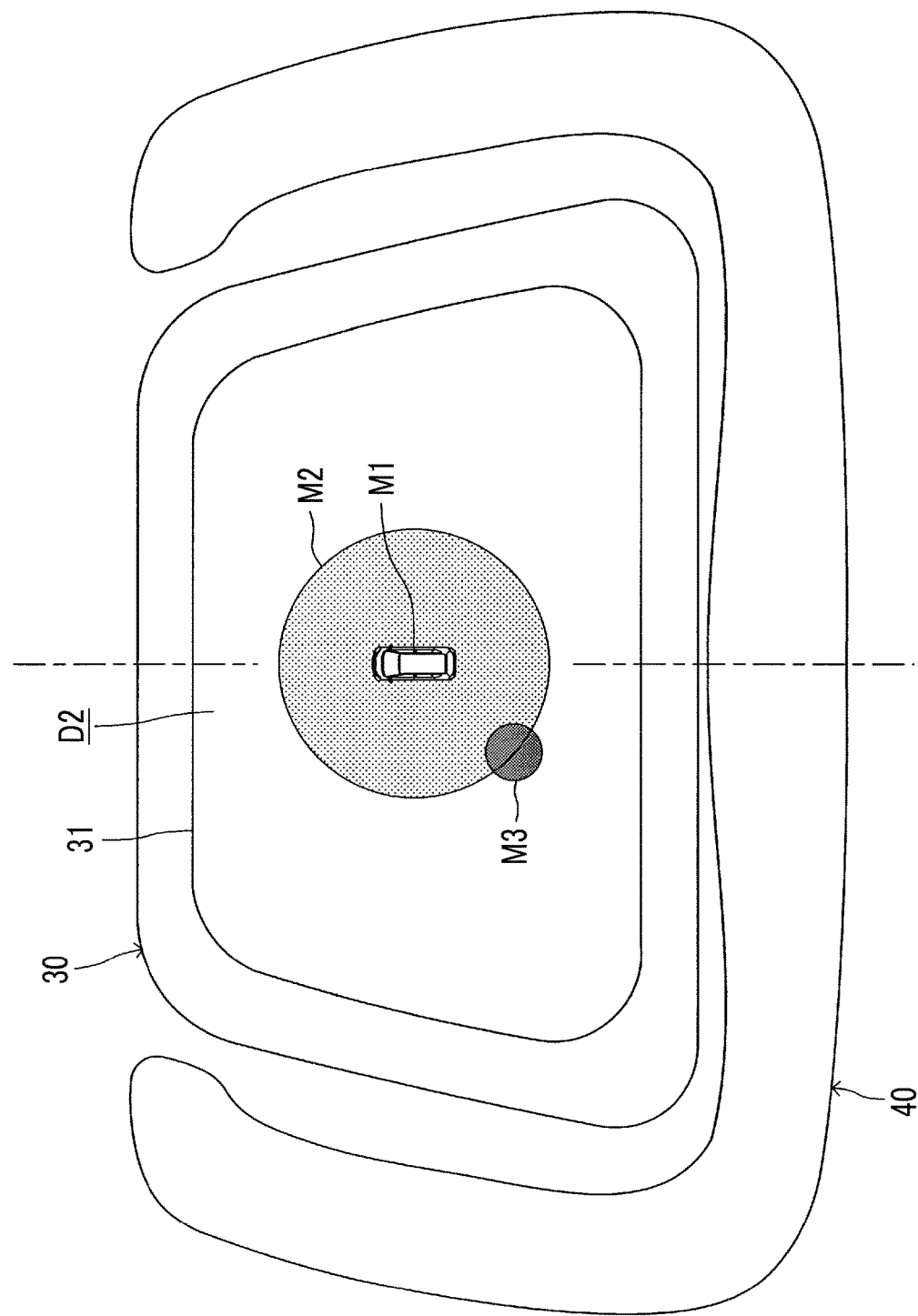

VEHICULAR DISPLAY DEVICE

INCORPORATION BY REFERENCE

The disclosure of Japanese Patent Application No. 2017-198334 filed on Oct. 12, 2017 including the specification, drawings and abstract is incorporated herein by reference in its entirety.

BACKGROUND

1. Technical Field

The disclosure relates to a vehicular display device which informs a driver of the presence of a warning object that needs to be recognized by the driver through displaying of an in-vehicle display unit when the warning object is detected in a surrounding region of a host vehicle.

2. Description of Related Art

In the related art, a vehicular display device which informs a driver of a surrounding situation detected by a surrounding sensor such as a radar through a display unit has been known. For example, an in-vehicle device suggested in Japanese Unexamined Patent Application Publication No. 2016-45705 (JP 2016-45705 A) projects and displays a position of a host vehicle after a predetermined time and a movement trajectory of a host vehicle on a windshield by using marks thereof through a head-up display. When there is a warning to be given to a driver depending on a surrounding situation of the host vehicle, the in-vehicle device gives the warning to the driver by changing the color or movement of the mark through the head-up display.

SUMMARY

However, in the in-vehicle device suggested in JP 2016-45705 A, there is a possibility that the driver will not easily recognize the presence of a warning object in the surrounding region of the host vehicle and a direction in which the warning object is present.

The disclosure provides a vehicular display device capable of allowing a driver to easily recognize the presence of a warning object including a direction of the warning object.

An aspect of the disclosure relates to a vehicular display device including a surrounding information obtaining unit configured to obtain surrounding information indicating a surrounding situation of a host vehicle, and a display electronic control unit (ECU) configured to inform a driver of the presence of a warning object that needs to be recognized by the driver through displaying of an in-vehicle display unit by controlling the display of the in-vehicle display unit when the warning object is detected based on the surrounding information. The in-vehicle display unit has a display screen in a region surrounded by a grip of a steering wheel in a planar positional relationship when the driver views the steering wheel, and the display ECU is configured to display a host vehicle mark indicating the host vehicle in a central position of the steering wheel in a right-left width direction and display a warning object mark indicating the warning object in a position corresponding to a direction of the warning object relative to the host vehicle on the display screen.

The vehicular display device according to the aspect of the disclosure includes the surrounding information obtaining unit, and the display ECU. The surrounding information obtaining unit obtains the surrounding information indicating the surrounding situation of the host vehicle. When the warning object that needs to be recognized by the driver is detected based on the surrounding information, the display ECU informs the driver of the presence of the warning object through displaying of the in-vehicle display unit by controlling the display of the in-vehicle display unit.

The in-vehicle display unit has the display screen in the region surrounded by the grip of the steering wheel in the planar positional relationship when the driver views the steering wheel. Accordingly, the display screen may be or may not be positioned on the same plane as the grip of the steering wheel. The grip of the steering wheel may not be formed in a ring shape, and may be any type having a right grip portion gripped with the right hand (hereinafter, referred to as a "right grip portion") and a left grip portion gripped with the left hand (hereinafter, referred to as a "left grip portion"). Accordingly, in the aforementioned case, the display screen may be provided between the right grip portion and the left grip portion in the planar positional relationship when the driver views the steering wheel.

The display ECU displays the host vehicle ark indicating the host vehicle in the central position of the steering wheel in the right-left width direction and displays the warning object mark indicating the warning object in the position corresponding to the direction of the warning object relative to the host vehicle on the display screen.

The steering wheel is provided in front of the driver. Accordingly, the host vehicle mark displayed on the display screen is displayed on the central position of the driver in a right-left direction. Since the driver operates the steering wheel such that the steering wheel faces straight, a gaze direction of the driver and a direction in which the host vehicle mark is displayed toward the driver have a common orientation in a horizontal direction. Thus, the driver can easily (intuitively) recognize the positional relationship between the host vehicle and the warning object present in the surrounding region of the host vehicle from the position of the warning object mark relative to the host vehicle mark by imagining the host vehicle mark displayed on the display screen as the host vehicle being driven by the driver.

As stated above, according to the aspect of the disclosure, the driver can easily recognize the presence of the warning object including the direction of the warning object.

In the vehicular display device according to the aspect of the disclosure, the display ECU may be configured to display an area mark which is a graphic image indicating an area in which the warning object is detected (hereinafter, simply referred to as an "area mark") and display the warning object mark within the area mark on the display screen.

According to the aspect, the display ECU displays the area mark which is the graphic image indicating the area in which the warning object is detected and displays the warning object mark within the area mark on the display screen. In the aforementioned case, the warning object mark is displayed such that at least a part of the warning object mark enters the area mark. Accordingly, the driver can easily intuitively recognize that the warning object mark indicates the warning object and the warning object approaches the host vehicle. As a result, according to the aspect of the disclosure, the driver can more easily recognize the presence of the warning object. The area in which the warning object is detected may not be displayed as the area mark, and the area mark may be displayed such that the sensing of the surrounding situation of the host vehicle is imagined.

In the vehicular display device according to the aspect of the disclosure, the steering wheel may be formed in a U-shape by a right grip portion, a left grip portion, and a connection portion that connects a lower end of the right grip portion and a lower end of the left grip portion. The display screen may be provided in a region of which three sides are surrounded by the right grip portion, the left grip portion, and the connection portion (hereinafter, referred to as a "region R surrounded by a grip of the steering wheel") in the planar positional relationship when the driver views the steering wheel.

According to the aspect of the disclosure, the steering wheel is formed in a U-shape by a right grip portion, a left grip portion, and a connection portion that connects a lower end of the right grip portion and a lower end of the left grip portion. The driver performs a steering operation while gripping the right grip portion with the right hand and gripping the left grip portion with the left hand. The display screen is provided in the region of which the three sides are surrounded by the right grip portion, the left grip portion, and the connection portion in the planar positional relationship when the driver views the steering wheel. Accordingly, the driver can easily view the display screen.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram showing an image (normal image) displayed on the in-vehicle display unit;

FIG. 6 is a diagram showing an image (warning image) displayed on the in-vehicle display unit; and FIG. 7 is a diagram showing an image (warning image) displayed on the in-vehicle display unit, as a modification example.

DETAILED DESCRIPTION OF EMBODIMENTS

Hereinafter, a vehicular display device according to an embodiment of the disclosure will be described with reference to the drawings.

Figure 1:
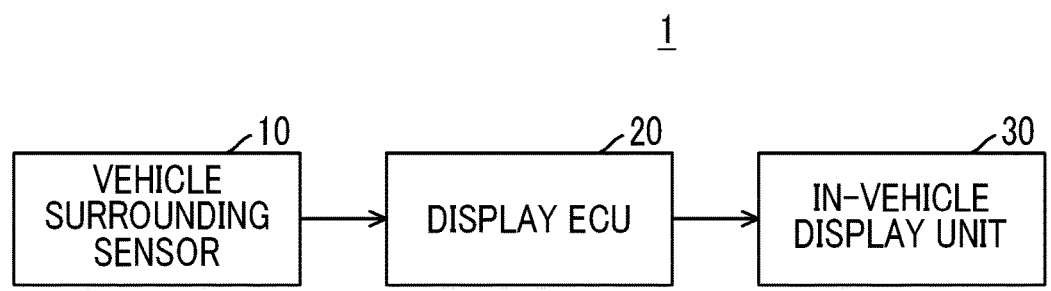
FIG. 1 is a system configuration diagram of a vehicular display device according to an embodiment.

FIG. 1 is system configurations of a vehicular display device 1 according to the embodiment of the disclosure. The vehicular display device is mounted on a vehicle. Hereinafter, the vehicle on which the vehicular display device 1 is mounted may be referred to as host vehicle.

The vehicular display device 1 includes vehicle surrounding sensors 10, a display ECU 20, and an in-vehicle display unit 30. The vehicle surrounding sensor 10 is a sensor that detects a surrounding situation of the host vehicle. For example, a millimeter wave radar sensor, rider sensor, an ultrasonic sensor, or a camera sensor may be used. The combination of the aforementioned sensors may be used as the vehicle surrounding sensor 10.

For example, the vehicle surrounding sensors 10 are respectively provided at four corners (for example, both right and left corners of a front bumper and both right and left corners of a rear bumper) on right, left, front, and rear sides of a vehicle body of the host vehicle, and detect three-dimensional objects present in the surrounding region of the host vehicle within detection areas assigned to these corners. Each of the vehicle surrounding sensors 10 outputs target information which is information regarding the detected three-dimensional object (hereinafter, referred to as a "target").

The target information is information representing a relative relationship between the host vehicle and the three-dimensional object (a distance between the host vehicle and the target, an orientation of the target with respect to the host vehicle, or a relative velocity of the host vehicle relative to the target) and the size (width) of the target. The vehicle surrounding sensor 10 obtains the target information for each detected target through calculation with a predetermined calculation cycle, and outputs the latest calculated target information. The target information is an example of surrounding information of the disclosure.

The display ECU 20 is an electronic control unit including a microcomputer as a main unit. In the present specification, the microcomputer includes a central processing unit (CPU), a read-only memory (ROM), a random-access memory (RAM), a nonvolatile memory, and an interface I/F. The display ECU 20 inputs the target information for each target output from the vehicle surrounding sensor 10, and determines whether or not the target is an object (warning object) that needs to be recognized by a driver for each target.

For example, when a target having a possibility of a collision with the host vehicle is detected, the display ECU 20 calculates a time to collision TTC which is a prediction time until the host vehicle collides with the target (a time left until the collision) by the following expression (1) based on a distance L between the target and the host vehicle and a relative velocity Vr of the host vehicle relative to the target.

$$TTC = L/Vr \qquad (1)$$

The time to collision TTC is used as an index value indicating the magnitude of a possibility of collision of the host vehicle with the target. As the time to collision TTC becomes shorter, the display ECU can determine that a possibility of collision of the host vehicle with the target is high. When the time to collision TTC is equal to or less than a preset warning object determination time, the display ECU 20 admits the target as the warning object.

The method of admitting the target as the warning object is not limited to a case where the time to collision TTC is used. For example, a target of which the distance L between the host vehicle and the target is equal to or less than a warning object determination distance may be admitted as the warning object. A target present in a blind spot region recognized as a blind spot by the driver and a target predicted to enter the blind spot region within a predetermined time may be admitted as the warning object. The target may be admitted as the warning object through the combination of the aforementioned admitting methods.

The display ECU 20 outputs image data corresponding to a relative position of the warning object relative to the host vehicle to the in-vehicle display unit 30.

Figure 2:
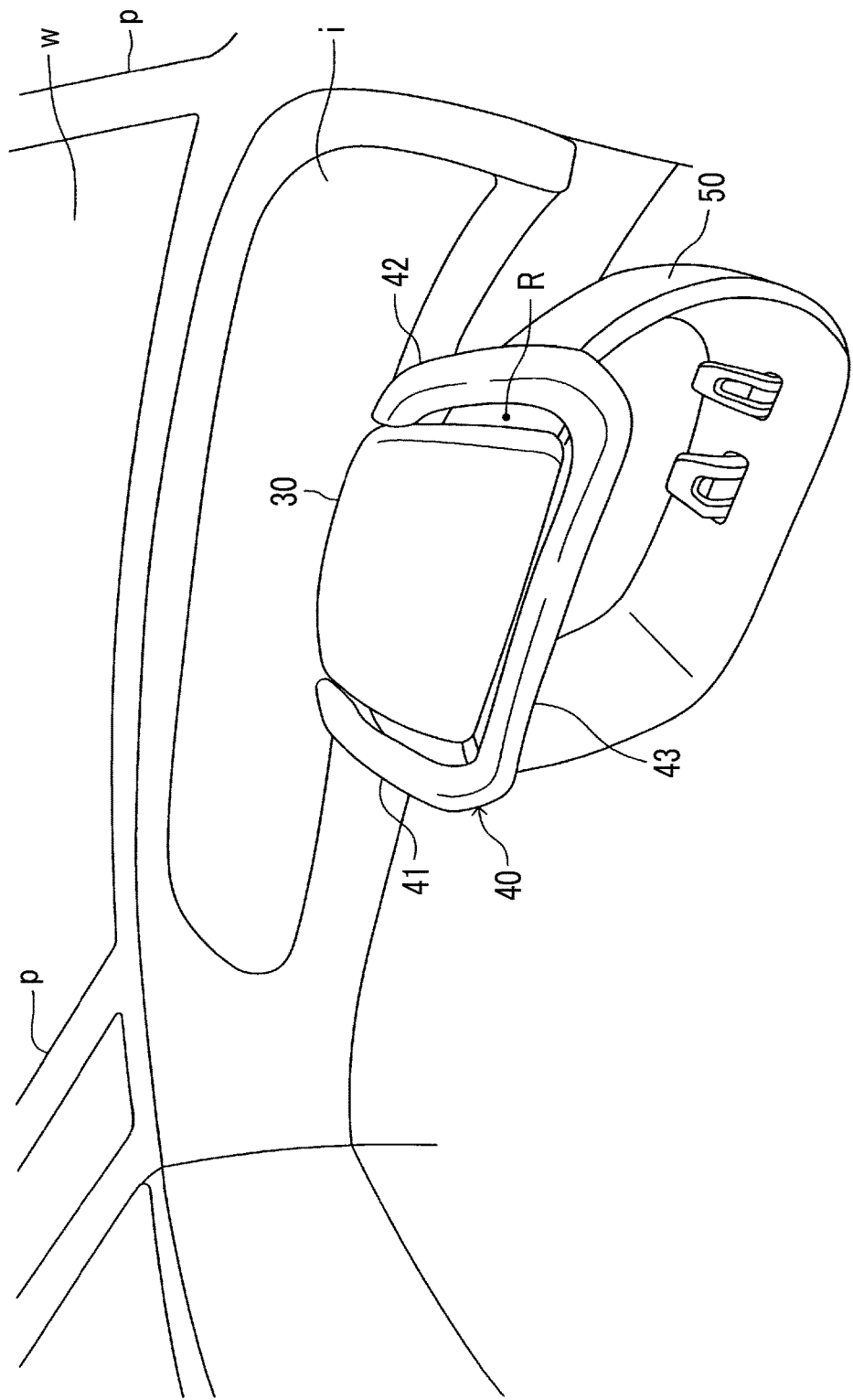
FIG. 2 is a perspective view of an in-vehicle display unit and a steering wheel provided in a vehicle cabin.
Figure 3:
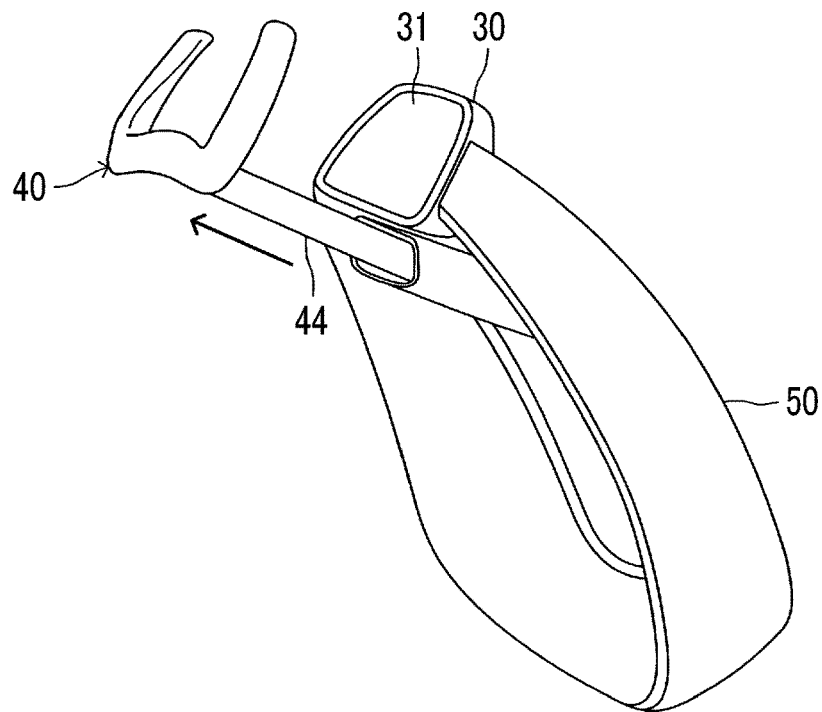
FIG. 3 is a perspective view showing a positional relationship between the in-vehicle display unit and the steering wheel when the steering wheel is in an available state.
Figure 4:
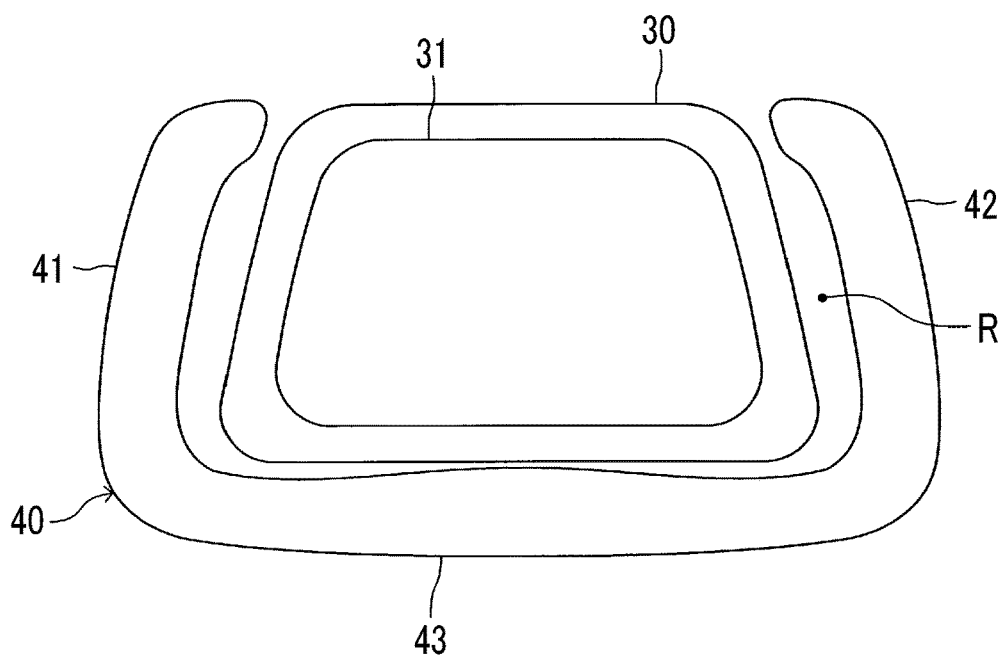
FIG. 4 is a front view of the steering wheel and the in-vehicle display unit.

As shown in FIGS. 2 to 4, the in-vehicle display unit 30 is disposed in the central position of a steering wheel 40. Hereinafter, the in-vehicle display unit 30 is simply referred to as the display unit 30. In FIG. 2, reference "w" denotes a windshield, reference "i" denotes an information display panel, and reference "p" denotes a pillar.

The steering wheel 40 is integrally formed in a U-shape by a right grip portion 42, a left grip portion 41, and a connection portion 43 that connects a lower end of the right grip portion 42 and a lower end of the left grip portion 41. The steering wheel 40 is formed such that a post portion 44 is connected to the center on the rear side of the connection portion 43, as shown in FIG. 3.

The post portion 44 is connected to an elevation mechanism (not shown), and moves so as to advance and retreat in an axial direction of the post portion 44. For example, the steering wheel 40 automatically moves upwards up to a preset set operation position so as to be directed obliquely upwards through the activation of the elevation mechanism when the vehicle is powered on, and automatically moves downwards up to a preset accommodation position through the activation of the elevation mechanism when the vehicle is powered off.

FIG. 2 shows the steering wheel 40 positioned in the accommodation position. In the aforementioned case, the steering wheel 40 and the display unit 30 are disposed on the substantially same plane. Meanwhile, when the driver performs a driving operation, the steering wheel 40 is disposed in the set operation position, as shown in FIG. 3. In the aforementioned case, the steering wheel 40 is positioned in the set operation position so as to be obliquely higher than the display unit 30. A steering operation of the steering wheel 40 is able to be performed in the set operation position.

A steering device of the vehicle on which the vehicular display device 1 according to the present embodiment is mounted is a by-wire type steering device in which the steering wheel 40 and a steering mechanism for turning the steering wheel are not mechanically connected. In the by-wire type steering device, a steering operation amount with which the driver operates the steering wheel 40 is detected by a steering sensor, and a power steering ECU turns the steering wheel by driving a turning motor according to a control amount corresponding to the steering operation amount.

The display unit 30 includes a display screen 31 within a region R surrounded by the grip of the steering wheel by the right grip portion 42, the left grip portion 41, and the connection portion 43 in a planar positional relationship when the driver views the steering wheel 40 irrespective of the elevation position of the steering wheel 40. In the present embodiment, the entire casing of the display unit 30 in addition to the display screen 31 is also disposed within the region R surrounded by the grip of the steering wheel 40 in the aforementioned planar positional relationship. When at least the steering wheel 40 is positioned in the set operation position, the display screen 31 may be provided within the region R surrounded by the grip of the steering wheel 40 in the aforementioned planar positional relationship, as shown in FIG. 4.

As shown in FIGS. 2 and 3, the display unit 30 is fixed by a belt-like support plate 50. The belt-like support plate 50 is connected to the vehicle body by a connection member (not shown). The display unit 30 is provided within the region R surrounded by the grip of the steering wheel 40, but is not mechanically connected to the steering wheel 40. Thus, operation force input to the steering wheel 40 by the driver is not transmitted to the display unit 30. Accordingly, the display unit 30 is stably fixed.

As shown in FIG. 4, the display unit 30 is disposed in the center of the region R surrounded by the grip of the steering wheel 40 in a right-left width direction in the planar positional relationship when the driver views the steering wheel 40. The display screen 31 is disposed in the center of a casing of the display unit 30 in the right-left width direction. Accordingly, the central position of the display screen 31 in the right-left width direction matches the central position of the steering wheel 40 in the right-left width direction.

FIGS. 5 and 6 each show a state in which an image is displayed on the display screen 31 by using image data items output from the display ECU 20. The display ECU 20 switches images to be displayed on the display screen 31 in a case where the target admitted as the warning object is not present and a case where the target is present. In FIG. 5, the image displayed on the display screen 31 is a display image (hereinafter, referred to as a "normal image D1") when the target admitted as the warning object is not present. The image displayed on the display screen 31 in FIG. 6 is a display image (hereinafter, referred to as a "warning image D2") when the target admitted as the warning object is present.

The display ECU 20 displays the normal image D1 on the display screen 31 when the target admitted as the warning object is not present, and displays the warning image D2 on the display screen 31 when the target admitted as the warning object is present.

On the normal image D1, a mark (hereinafter, referred to as a "host vehicle mark M1") indicating the host vehicle is displayed in the central position of the display screen 31 in the right-left width direction. Although it has been described in the present embodiment that the host vehicle mark M1 is displayed in the central position (the central position of the display screen 31 in the right-left width direction and an upper-lower direction) of the display screen 31, the position of the host vehicle mark in the upper-lower direction does not need to be displayed as described above.

As stated above, the central position of the display screen 31 in the right-left width direction matches the central position of the steering wheel 40 in the right-left width direction. Accordingly, the host vehicle mark M1 is displayed on the central position of the steering wheel in the right-left width direction.

On the normal image D1, area marks M2 which are graphic images indicating areas in which the warning objects are detected are displayed. In the present embodiment, each of the area marks M2 is displayed in a fan shape so as to be radially widened from each of the four corners of the host vehicle (each of the positions of the vehicle surrounding sensors 10).

Accordingly, the host vehicle mark M1 and the area marks M2 are displayed in the fixed positions on the normal image D1.

Meanwhile, a warning object mark M3 indicating the warning object is displayed on the warning image D2 (FIG. 6) in addition to the host vehicle mark M1 and the area marks M2. The display positions of the host vehicle mark M1 and the area marks M2 on the warning image D2 match the display positions of those on the normal image D1. The warning object mark M3 is displayed such that at least a part of the warning object mark M3 enters the area mark M2. In the aforementioned case, the display ECU 20 displays the warning object mark M3 in a position in which a direction of the warning object mark M3 relative to the host vehicle mark M1 is the same as a direction of the warning object relative to the host vehicle obtained from the target information based on the target information. A separation between the host vehicle mark M1 and the warning object mark M3 may be a predetermined constant distance, or may be set to be a variable distance such that the higher an emergency level (for example, the time to collision TTC), the shorter the separation.

The steering wheel 40 is provided in front of the driver. Accordingly, the host vehicle mark M1 displayed on the display screen 31 is displayed in the central position of the driver in the right-left direction. Since the driver operates the steering wheel 40 such that the steering wheel faces straight, a gaze direction of the driver and a direction in which the host vehicle mark M1 is displayed toward the driver have a common orientation in a horizontal direction. Thus, the driver can easily (intuitively) recognize the positional relationship between the host vehicle and the warning object present in the surrounding region of the host vehicle from the position of the warning object mark M3 relative to the host vehicle mark M1 while imagining the host vehicle mark M1 displayed on the display screen 31 as the host vehicle being driven by the driver.

Since the area marks M2 are displayed on the display screen 31, the driver can easily recognize that the surrounding situation of the host vehicle is sensed. The warning object mark M3 is displayed such that a part of the warning object mark M3 enters the area mark M2. Thus, the driver can easily intuitively recognize that the warning object mark M3 indicates the warning object and the warning object approaches the host vehicle.

Therefore, in accordance with the vehicular display device 1 according to the present embodiment, the driver can easily recognize the presence of the warning object including the direction of the warning object.

In the present embodiment, since the steering wheel 40 is formed in the U-shape in which the upper parts of right and left grip portions 42, 41 are opened, the driver can easily view the display screen 31.

While the vehicular display device according to the embodiment has been described, the disclosure is not limited to the embodiment, and may be changed in various manners without departing from the object of the disclosure.

For example, although it has been described in the present embodiment that the steering wheel 40 is formed in the U-shape in which the upper part thereof is opened, the steering wheel may not have the aforementioned shape. The steering wheel may be a type having a typical ring-shaped grip (a type in which the entire circumference is a grip) or may be any type having the right grip portion gripped with the right hand and the left grip portion gripped with the left hand.

Although it has been described in the present embodiment that the area marks M2 are displayed on the display screen 31, the area marks M2 may be omitted. Although it has been described in the present embodiment that the shape of the area mark M2 is the fan shape so as to be radially widened from each of the four corners of the host vehicle (each of the positions of the vehicle surrounding sensors), the shape of the area mark M2 may be set as any mark. For example, a mark represented by surrounding the surrounding region of the host vehicle mark M1 with a circle may be set as the area mark M2 as shown in FIG. 7.

Although it has been described in the present embodiment that the host vehicle mark M1 is designed as the vehicle shape, the host vehicle mark may not have the aforementioned shape. The host vehicle mark may have a simple shape, for example, any shape such as a circle, an ellipse, or a polygon. Similarly, although it has been described in the present embodiment that the warning object mark M3 is the circular shape, the warning object mark may have any shape.

What is claimed is:

1. A vehicular display device comprising:
   a surrounding information obtaining unit configured to obtain surrounding information indicating a surrounding situation of a host vehicle; and
   a display electronic control unit configured to inform a driver of a presence of a warning object that needs to be recognized by the driver through displaying of an in-vehicle display unit by controlling the display of the in-vehicle display unit when the warning object is detected based on the surrounding information, wherein:
   the in-vehicle display unit has a display screen in a region surrounded by a grip of a steering wheel in a planar positional relationship when the driver views the steering wheel; and
   the display electronic control unit is configured to display a host vehicle mark indicating the host vehicle in a central position of the steering wheel in a right-left width direction and display a warning object mark indicating the warning object in a position corresponding to a direction of the warning object relative to the host vehicle on the display screen.

2. The vehicular display device according to claim 1, wherein the display electronic control unit is configured to display an area mark which is a graphic image indicating an area in which the warning object is detected and display the warning object mark within the area mark on the display screen.

3. The vehicular display device according to claim 1, wherein:
   the steering wheel is formed in a U-shape by a right grip portion, a left grip portion, and a connection portion that connects a lower end of the right grip portion and a lower end of the left grip portion; and
   the display screen is provided in the region of which three sides are surrounded by the right grip portion, the left grip portion, and the connection portion in the planar positional relationship when the driver views the steering wheel.

* * * * *